(12) United States Patent
Paulsen

(10) Patent No.: US 9,944,141 B2
(45) Date of Patent: Apr. 17, 2018

(54) CONTROL ARM

(71) Applicant: Raufoss Technology AS, Raufoss (NO)

(72) Inventor: Frode Paulsen, Gjovik (NO)

(73) Assignee: RAUFOSS TECHNOLOGY AS, Raufoss (NO)

(*) Notice: Subject to any disclaimer, the term of this patent is extended or adjusted under 35 U.S.C. 154(b) by 0 days.

(21) Appl. No.: 15/249,235

(22) Filed: Aug. 26, 2016

(65) Prior Publication Data
US 2017/0057313 A1 Mar. 2, 2017

(30) Foreign Application Priority Data
Aug. 28, 2015 (NO) .................... 20151101

(51) Int. Cl.
B60G 15/00 (2006.01)
B60G 7/00 (2006.01)
B33Y 10/00 (2015.01)
B33Y 80/00 (2015.01)
B21D 53/88 (2006.01)
B22D 25/02 (2006.01)
B21J 9/02 (2006.01)
B21K 7/00 (2006.01)

(52) U.S. Cl.
CPC ............ B60G 7/001 (2013.01); B21D 53/88 (2013.01); B21J 9/027 (2013.01); B21K 7/00 (2013.01); B22D 25/02 (2013.01); B33Y 10/00 (2014.12); B33Y 80/00 (2014.12); B60G 2204/1244 (2013.01); B60G 2206/10 (2013.01); B60G 2206/7102 (2013.01); B60G 2206/8101 (2013.01); B60G 2206/8103 (2013.01); B60G 2206/8112 (2013.01)

(58) Field of Classification Search
CPC .............. B60G 7/001; B60G 2204/124; B60G 2206/7102; B60G 2206/8103; B60G 2206/8102; Y10T 29/49996; Y10T 29/49622
USPC .................................... 280/124.147, 124.148
See application file for complete search history.

(56) References Cited

U.S. PATENT DOCUMENTS 6,398,451 B1 * 6/2002 Zetterstrom ....... B60G 21/0551
280/124.106
6,810,586 B1   11/2004 Waaler et al.
6,908,076 B2 *  6/2005 Hayashi .............. B60G 13/003
267/153

(Continued)

FOREIGN PATENT DOCUMENTS

EP   1364817 A2   11/2003
EP   1642754 A1    4/2006
JP   H03216227 A   9/1991

(Continued)

Primary Examiner — Toan To
(74) Attorney, Agent, or Firm — Thomas Schneck

(57) ABSTRACT

A control arm for the rear wheel suspension of a car where the control arm includes a cup-shaped spring mount with branches projecting from the spring seat. The branches may be designed as closed channels or U-shaped channels. In the upper part of the control arm there are flanges projecting from each side thereof. The flanges include a reinforced area around the spring seat. The cup-shaped spring seat is reinforces with wedges on the inside thereof. The spring seat and branches form a stiff frame structure. Also described is a method for manufacturing the control arm by forging.

7 Claims, 4 Drawing Sheets

(56) References Cited

U.S. PATENT DOCUMENTS

2007/0158925 A1* 7/2007 Fader .................. B60G 11/16
   280/124.147

FOREIGN PATENT DOCUMENTS

| JP | 00103561 A1 | 1/2000 |
| WO | WO0004296 A1 | 1/2000 |
| WO | WO2006046876 A1 | 5/2006 |

* cited by examiner

CONTROL ARM

TECHNICAL FIELD

The present invention relates to a control arm in the rear wheel suspension in a car, and in particular an elongate rear control arm which is the lower member in a multi-link rear wheel suspension, and more particular a lower arm carrying a spring or spring-and-damper unit.

BACKGROUND ART

From prior art, there are known several methods for producing such arms. A first method involves pressing two parts in sheet steel and joining the two parts along the rims. A recessed spring seat is formed in the lower part, with an opening in the upper part above the seat. The recessed mounting of the spring has the advantage that the spring will not protrude so far into the car body, i.e. the upper mounting point can be lowered giving more available room in the luggage compartment. Alternatively, a longer spring may be used allowing a longer stroke and a more comfortable ride. However, these steel arms are relatively heavy, even though being hollow. Generally, the un-sprung components of a wheel suspension should be kept as light as possible, in order to improve the road handling properties of the car. Further the hollow steel arms are apt to corrode. Another disadvantage of these arms is the involved production process, including pressing, punching, welding and painting. The production process involves several steps that must be performed at independent stations.

From the applicant's U.S. Pat. No. 6,810,586 there is known a rear control arm made from an extruded aluminum profile specially designed for the purpose. The aluminum profile has a hollow closed cross section with an optimized distribution of material. This control arm has several advantages, of which one is that it can be produced in standard machinery for cold forming, avoiding more involved processes such as welding, hydro forming, etc. Another advantage is the low weight, the stiffness caused by the shape of the profile, and the corrosion resistance from using aluminum. While this arm has proved to be a success in the market, it has a disadvantage in that the spring is mounted on the top surface of the arm limiting the space available for the spring and limiting the ground clearance.

The applicant is also the originator of another control arm, disclosed in WO 2006/046876 which is produced from an extruded aluminum profile with two channels separated by a web. This profile has a recessed spring seat. Also this arm may be produced in a compact work station using standard cold forming methods.

SUMMARY DISCLOSURE

The object of the present invention is to provide a control arm which is light in weight, has a recessed spring mount, which may be produced in a production process involving a limited number of steps and wherein most of the process may be performed at a single production station. Further, other objects are to devise an arm that is very ductile and may withstand large external forces, and which may be produced from standard stock material.

According to a first aspect, the invention relates to a control arm for a wheel suspension assembly of a car, the control arm being made of aluminum or an aluminum alloy, wherein the control arm includes a cup-shaped spring seat to carry a spring, the spring seat having a bottom wall and a side wall, the bottom wall defining a lower level of the control arm, the opening of the cup-shaped spring seat defining an upper level of the control arm, two integrated branches, either hollow or open, projecting directly out of the side wall of the cup-shaped spring seat, on opposing sides thereof.

This provides a control arm in lightweight aluminum allowing a recessed mounting of the spring assembly, and with a homogeneous and strong structure.

A second aspect of the invention relates to a method for producing the control arm, including the steps of: forming an elongate cylindrical billet from aluminum or aluminum alloy, positioning the billet in a press with a mold assembly including an upper mold and a lower mold, vertical and horizontal dies corresponding to the mold assembly, pressing the vertical die into the billet forming a cup-shaped spring seat in the billet, forcing horizontal dies into the billet from each end thereof forming in-line branches projecting from said spring cup.

This production method provides an arm with an elongated grain structure in the aluminum material, again providing a strong structure against external forces straining the arm.

DETAILED DESCRIPTION

Figure 1:
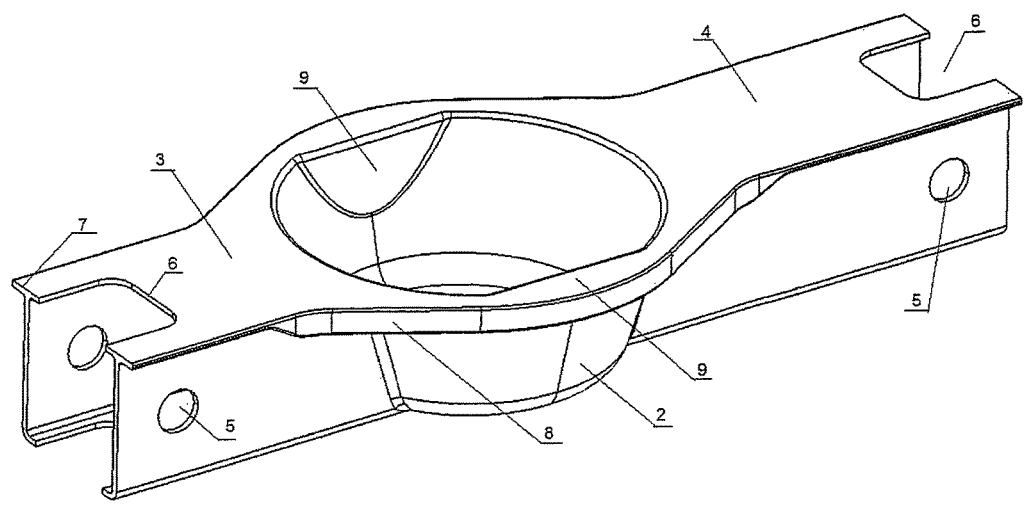
FIG. 1 is a perspective view of a control arm according to the invention.

FIG. 1 shows a control arm 1 according to the invention. The control arm 1 includes a centrally located cup 2 forming a spring seat. On each side of the cup 2 there are branches 3, 4 projecting from the cup. The branches 3, 4 may be located in line or with a small angle between the branches, sideways, vertically or both, and with the lower surfaces of the branches and spring seat meeting at the same level, i.e. with the spring seat recessed into the compound arm. In the distant ends of the branches there are made fastening holes 5 and cut-outs 6 for the mounting of the arm in the car. The branches are designed as closed channels. The channels may be square in cross section, but other shapes are also possible, such as rectangular or trapezoid. Flanges 7 are protruding along the upper part of the arm, on both sides thereof. The flanges are thickened in an area 8 around the seat 2. On the inside of the seat cup there are also thickened areas or wedges 9 on each side.

The object of using this particular design is to improve the integrity of the arm. In the car, the arm is exposed to vertical forces from the car body through the spring and vertical and lateral forces from the wheel. These forces will try to bend or buckle the arm, and in particular the area around the spring seat forms a weak point.

The closed channels in the branches 3, 4 prevent the sidewalls from bending out i.e. the top wall will hold the sidewalls together. The flanges at the upper wall of the arm will provide a similar effect. The flanges are reinforced around the cup and there have been added reinforcing wedges on the inside of the cup. These reinforcements have been made to prevent the cup from deforming and collapsing when loaded. Loads on the arm will create forces trying to bend out the sidewall of the cup, i.e. transverse to the longitudinal axis of the arm, and fold the cup. The mentioned reinforcements will prevent this from happening under normal loads.

This design of the integrated control arm will bridge the branches and cup into a stiff frame.

Figure 2:
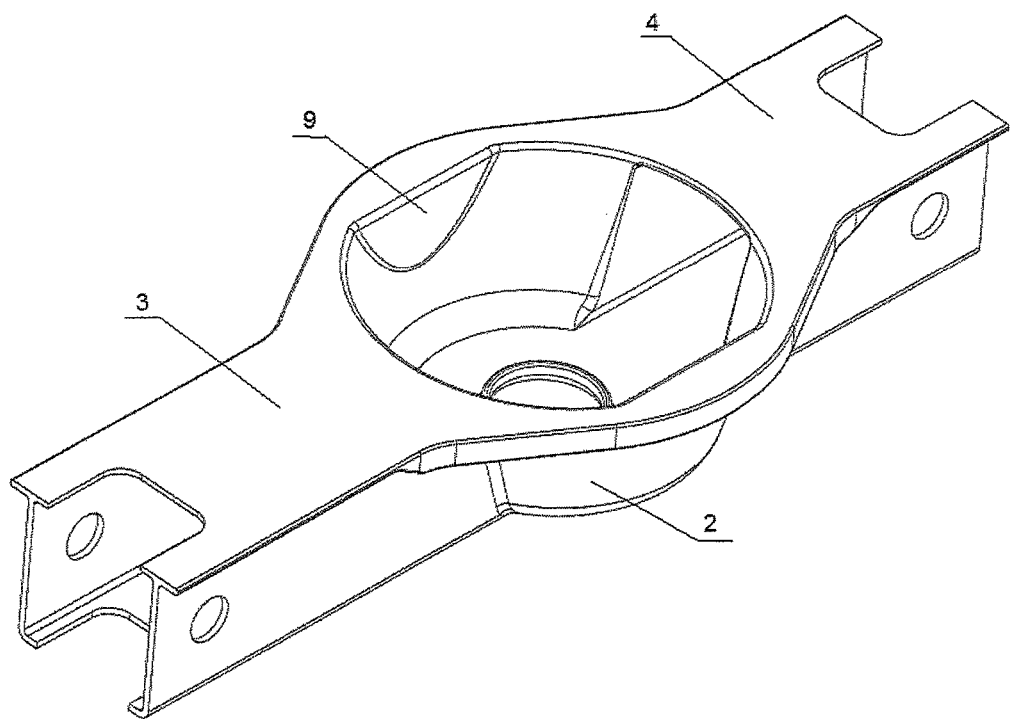
FIG. 2 shows another embodiment of the inventive control arm.

FIG. 2 shows an embodiment of the arm wherein the opening of the hollow branches penetrates the spring cup.

Figure 3:
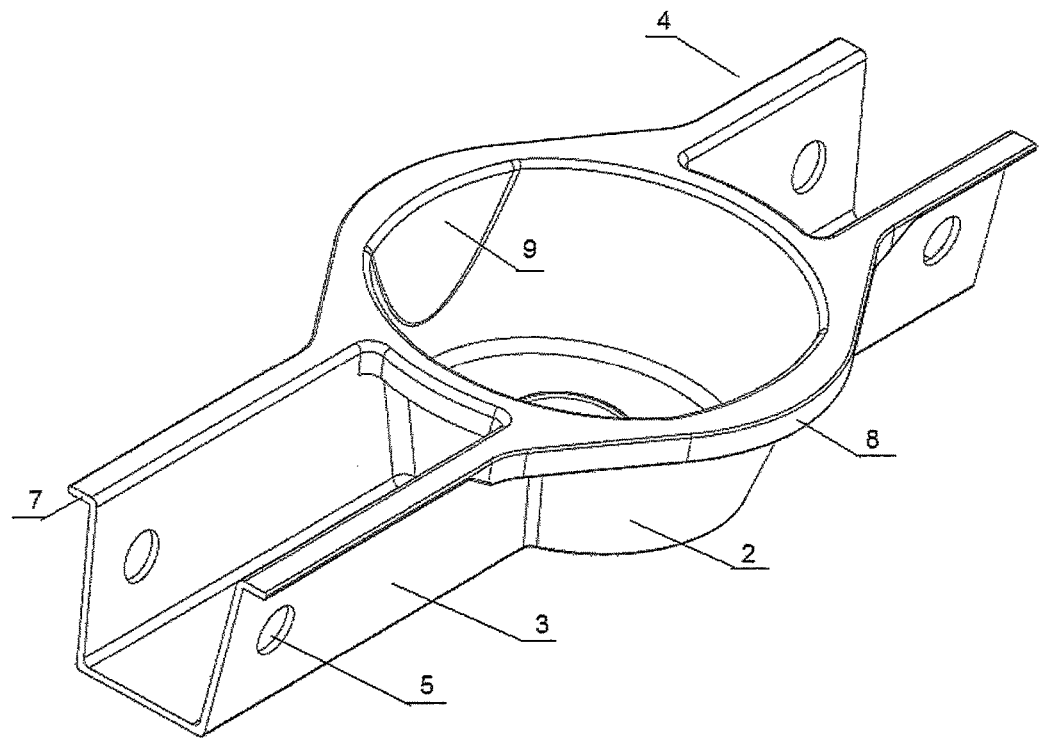
FIG. 3 shows a third embodiment of the arm.

FIG. 3 shows an alternative embodiment of the arm wherein the branches 3, 4 are designed as open U-shaped channels. The channels are open in the upper direction, with flanges 7 around the open parts reinforcing the branches to prevent the sidewalls from flexing when the arm is loaded.

Figure 4:
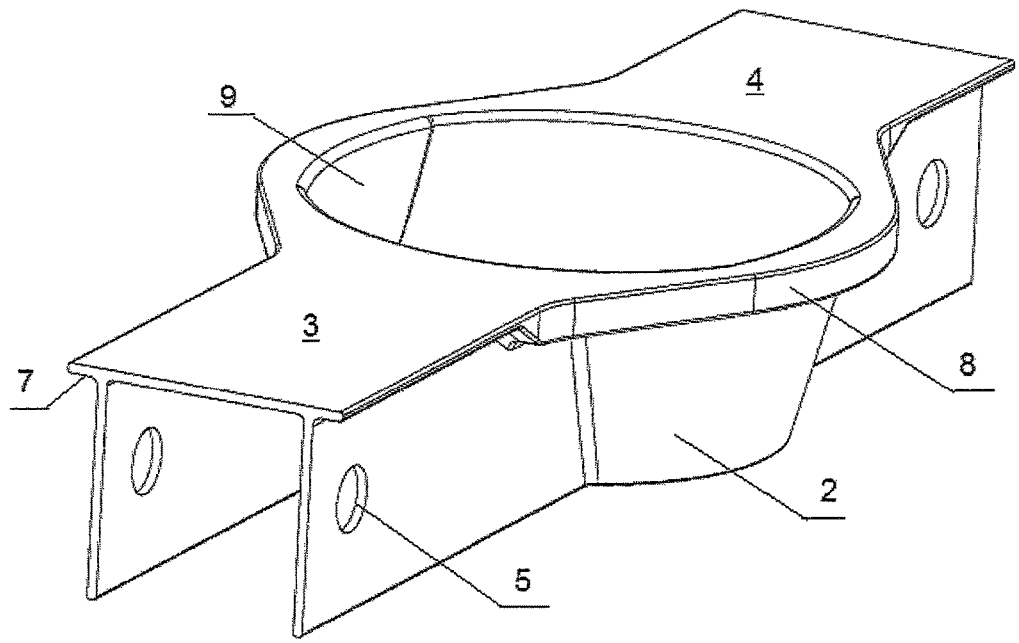
FIG. 4 shows a fourth embodiment of the arm.
Figure 5:
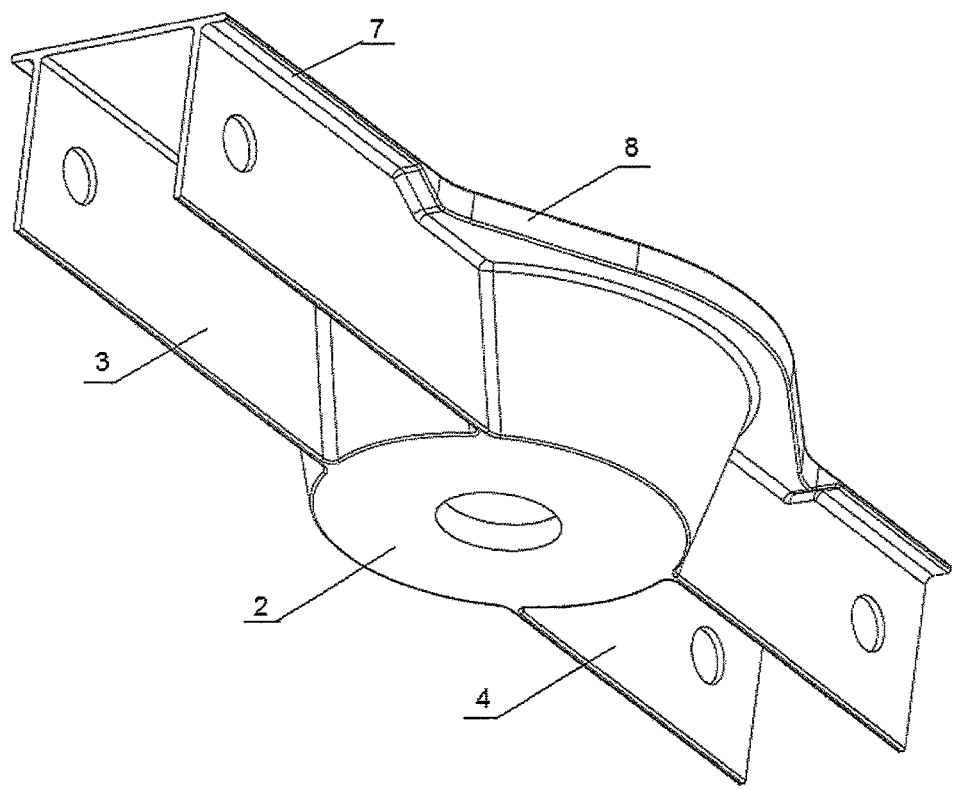
FIG. 5 shows the fourth embodiment as seen from below.

FIGS. 4 and 5 shows yet another embodiment, wherein the branches are designed as U-channels with the open parts turned downwards. However, the flanges 7 are still located at the upper part of the branches, i.e. around the bottom part of the channels.

Figure 6:
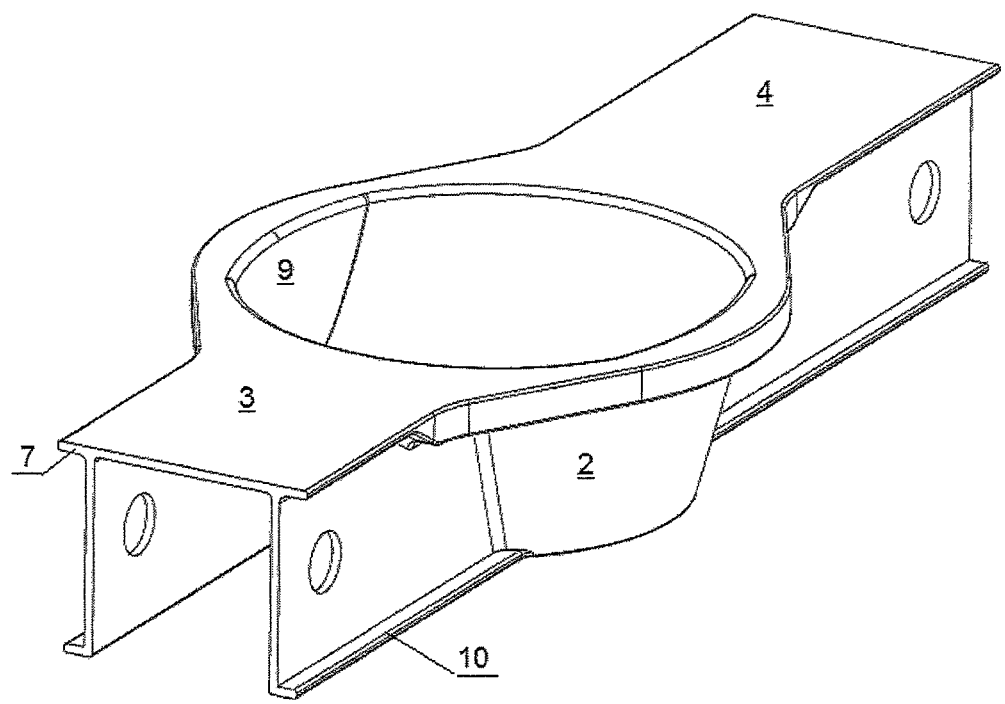
FIG. 6 shows a fifth embodiment of the arm.

FIG. 6 shows a variety of the embodiment of FIGS. 3 and 4, with a second set of flanges 10 located at the bottom of the arm around the open part of the channels.

Figure 7:
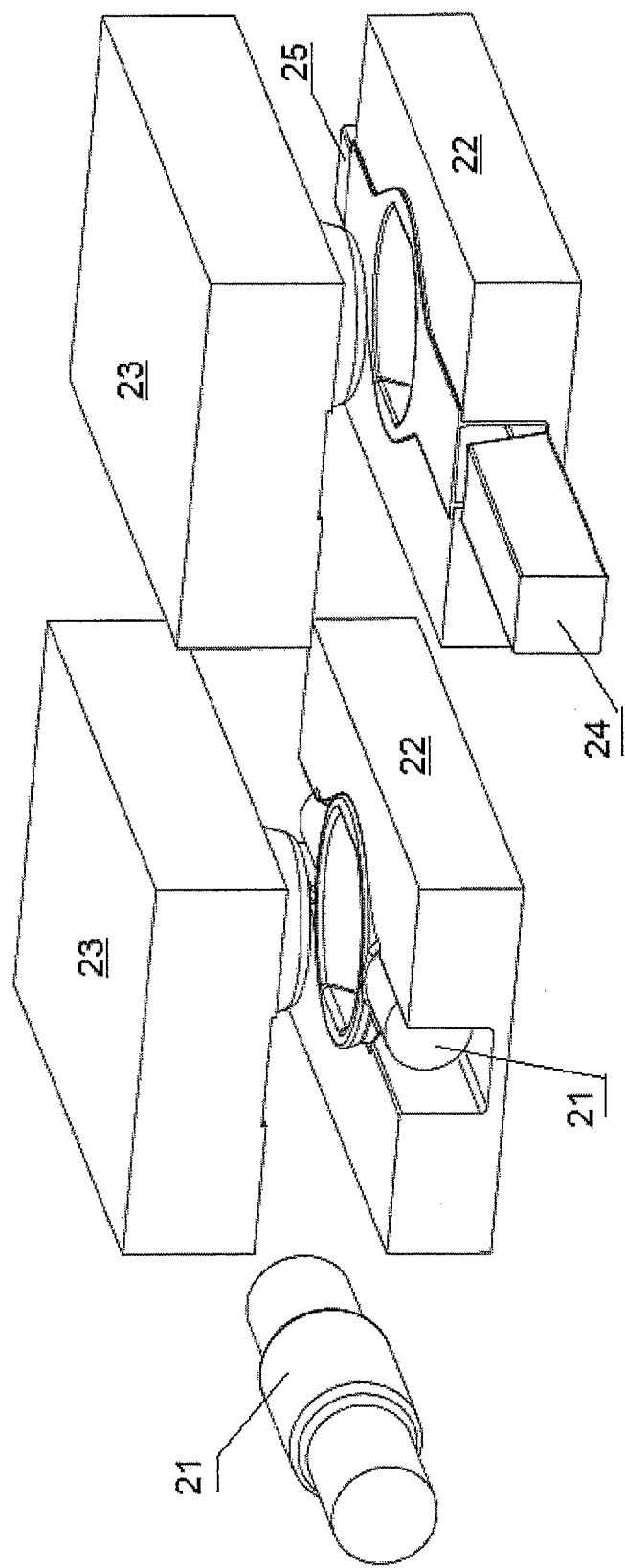
FIG. 7 illustrates a method for manufacturing a control arm according to the present invention.

The production process is illustrated in FIG. 7. In a first step a billet 21 is formed consisting of a cylindrical piece from aluminum or an aluminum alloy, and which may be provided with an enlarged portion where the cup is to be located. The billet may be round, square or multi-cornered in cross section. In FIG. 6 the billet is shaped as a cylindrical object with larger diameter in the middle.

Then, the billet 21 is positioned in a press with molds and dies. In the illustrated embodiment, it is used a lower mold 22 and an upper mold 23. The molds 22, 23 are closed upon the billet 21 forming the cup part. The figure shows the molds separated after forming the cup, but this will normally not be the case. The molds are kept closed until the process is completed.

In the next step, two opposing horizontal dies 24, 25 are pressed into the cylindrical ends of the billet forming elongated tubes. The right hand sketch in FIG. 6 shows the situation when the dies have been retracted and the molds are opening to relieve the finished arm.

FIG. 6 illustrates a possible method for forming a control arm according to the embodiment in FIG. 1. The embodiments of FIGS. 2-4 may also be manufactured using this method, but may also be produced in a simplified method using only the vertical molds, the molds being shaped to produce the arm in one step avoiding the dies.

Presently, the preferred embodiment of the invention involves forging as detailed above, as this provides a very ductile and strong arm.

Alternatively, the control arm may be casted in aluminum. The arms can be supported by cores that are removed after solidification of the material. A disadvantage of this solution is the low ductility obtained due to the cast grain structure of the material. The reduced ductility may mean reduced fatigue lifetime for the arm. It may be necessary to increase the dimensions and weight to obtain sufficient strength. It may also be necessary to introduce steps to improve ductility, either by heat treatment or by producing a cast semi-product that is finished by forging.

3D-printing is a rapidly developing technique. We may foresee that in the future, 3D-printing may become a feasible technique for producing this arm. However, 3D metal printing suffers from the same disadvantages as the casting method due to the cast grain structure discussed above, and if needed, the same measures may have to be taken to improve the ductility.

What is claimed is:

1. A control arm for a wheel suspension assembly of a car, the control arm being made of aluminum or an aluminum alloy, the control arm comprising:
    a cup-shaped spring seat to carry a spring, the spring seat having a bottom wall and a side wall, the bottom wall defining a lower level of the control arm, the opening of the cup-shaped spring seat defining an upper level of the control arm;
    two integrated branches, either hollow or open, projecting directly outwardly of the side wall of the cup-shaped spring seat, on opposing sides thereof;
    the first flanges protruding from the control arm branches on each side at the upper level of the control arm and having an increased thickness in an area around the spring seat and with the second flanges protruding from the branches on each side at the lower level of the arm.

2. A control arm according to claim 1, wherein at least a portion of the branches are made as hollow profiles which are closed in cross section.

3. A control arm according to claim 1, wherein the branches are made as U-shaped channels with the open parts of the channels aligned with said upper level of the control arm.

4. A control arm according to claim 1, wherein the branches are made as U-shaped channels with the open parts of the channels aligned with said lower level of the control arm.

5. A control arm according to claim 1, further including reinforcing wedges on the inside of the side wall of the cup-shaped spring seat.

6. A method for producing a control arm for a wheel suspension of a car, including the steps of:
    forming an elongate billet from aluminum or aluminum alloy;
    positioning the billet in a press with a mold assembly including an upper mold, a lower mold and horizontal dies corresponding to the mold assembly;
    pressing the upper and lower molds into the billet forming a cup-shaped spring seat in the billet; and
    forcing the horizontal dies into the billet from each end thereof forming branches projecting from said spring cup.

7. A method for producing the control arm according to claim 6, wherein the control arm is cast.

* * * * *